July 29, 1969  J. M. LAUNDER  3,458,002
ROTARY WEIGHER

Filed July 24, 1967  6 Sheets-Sheet 1

INVENTOR.
JAMES M. LAUNDER

BY
Jeffers and Young
ATTORNEYS

INVENTOR.
JAMES M. LAUNDER
BY
*Jeffers and Young*
ATTORNEYS

INVENTOR.
JAMES M. LAUNDER
BY
Jeffers and Young
ATTORNEYS

United States Patent Office 3,458,002
Patented July 29, 1969

3,458,002
ROTARY WEIGHER
James M. Launder, Wabash, Ind., assignor to The Hupsi Corporation, Wabash, Ind., a corporation of Indiana
Filed July 24, 1967, Ser. No. 655,632
Int. Cl. G01g 13/22
U.S. Cl. 177—83          14 Claims

ABSTRACT OF THE DISCLOSURE

A rotary bin weigher is suspended by an improved beam construction that has low friction pivots. The weigher stop and release mechanism has a beam construction that also has low friction pivots, that provides parallelogram action with the bin beam construction, and that provides a dynamic release.

Background of the invention

My invention relates to a rotary weigher, and particularly to an improved rotary weigher for weighing dry or granular materials accurately and at relatively high speed.

Accurate weighing of materials, particularly dry or granular materials, at relatively high speed is desirable or necessary in many applications. One example is the packaging of cereals, soaps, and other commodities in individual boxes or packages for consumers. In this example, the commodity is supplied in a stream to the weigher which weighs a desired or predetermined weight and supplies or discharges the weighed commodity to a box or package. If the packaging is done in large quantities, the boxes may be moved on a conveyor past the weigher which supplies the weighed commodity to each box as the box passes by. Another example is the supplying of feed to a poultry house at desired times or as the feed is demanded. In this example, the condition of the poultry can be appraised or even forecast by an accurate indication of the quantity of feed being consumed by the poultry. If the poultry are fed at desired or predetermined times, the feed must be supplied at a relatively high rate so that all of the poultry will be fed at approximately the same time. But even though the feed is supplied at a relatively high rate, the quantity of feed actually supplied should be accurately known in order to appraise the condition of the poultry.

Accordingly, an object of my invention is to provide an improved weigher of the rotary bin type.

Another object of my invention is to provide an improved rotary bin type of weigher that is faster and more accurate in weighing dry or granular materials than previously known weighers.

Previous rotary or rotary bin weighers have been inadequate in that they do not or can not provide weighings which meet the requirements or standards of many present applications. In applications where a relatively large amount of material is delivered and is stated to be a given total weight, a number of relatively small weighings may be required in order to check the total weight. However, previous weighers were not sufficiently accurate to provide an accurate check on the total weight. Or in applications such as poultry houses where it may be desirable to weigh and then supply feed at a relatively fast rate, previous weighers have not been sufficiently fast or rapid. Or, previous weighers were not as consistent as the application required, or were too costly. These and other inadequacies of previous weighers have resulted in inaccurate weighings, slow production or rate of weighed material flow, or inconsistent weighings.

Accordingly, another object of my invention is to provide a rotary weigher that is relatively and consistently accurate in its weighings.

Another object of my invention is to provide a rotary weigher that is relatively fast in its operation.

Another object of my invention is to provide a rotary weigher that is both relatively fast in its operation and relatively and consistently accurate in its weighings.

Another object of my invention is to provide a rotary weigher that is relatively fast and accurate and that is also relatively inexpensive.

In evaluating previous rotary or rotary bin weighers, I have found that their relative inaccuracies, slowness, and inconsistencies result from several factors. One factor is that the bearings and pivots require a relatively large amount of torque to overcome their static friction. Another factor is that the stop and release mechanism does not provide a parallelogram configuration or construction with the support beam. Another factor is that the release mechanism also has a relatively large amount of static friction. Another factor is that the moving parts are relatively heavy and have relatively large inertia.

Accordingly, another object of my invention is to provide a rotary weigher having pivots and bearings of relatively low friction.

Another object of my invention is to provide a rotary weigher having a parallelogram configuration.

Another object of my invention is to provide a rotary weigher having a release mechanism which permits motion of parts of the weigher prior to completion of a weighing so that static friction is overcome at least in part by the inertia of the parts as well as by the weight of the weighed material.

Another object of my invention is to provide a rotary weigher having relatively light parts with a corresponding low inertia that permit the rotating parts to move quickly so that the incoming stream of material is precisely and accurately cut off or diverted from the weighed material.

Another object of my invention is to provide a rotary wiegher having a release mechanism with flat or rounded surfaces as opposed to knife edged surfaces. Such flat or rounded surfaces do not wear as much as a knife edged surface on release, so that the weigher maintains its accuracy and calibration for a relatively long time or for a relatively large number of release operations.

Summary of the invention

Briefly, these and other objects are achieved in accordance with my invention by a rotary weigher constructed of relatively light material such as aluminum or plastic. The light material permits the use of smaller bearings or pivots which require a lower torque to overcome their static friction. A rotary bin or hopper is suspended for rotataion about an axis on one end of a main beam which is pivoted on a common axis and which is provided with an adjustable weight at its other end. A stop beam is pivoted on a common axis and extends from its pivot axis and terminates at an end. The rotary bin or hopper is provided with one or more compartments and one or more corresponding stops which sequentially engage the end of the stop beam. The three axes and the one stop engaging the end of the stop beam are located at the corners of a parallelogram configuration. During each weighing, the one stop engaging the end of the stop beam prevents the bin or hopper from rotating until the bin or hopper receives the desired weight of material. The main beam then pivots so that the bin rotational axis and the bin stop move downward to release the bin or hopper so that it can rotate to discharge the weighed material and receive more material. The stop beam has limit arms and a fixed stop which limit the pivotal movement of the stop beam. The main beam also has a limit arm and fixed stops, one of which has resilient characteristics that tend to pivot the main beam in the direction to release the bin. This tendency to pivot the main beam and release the bin or hopper starts the pivotal movement of the main beam before the desired weight is reached so that the static friction of the pivots is overcome during the weighing. The pivotal movement continues, and when a stop beam limit arm engages its stop, the momentum of the device overcomes the static friction between the bin stop and the end of the stop beam. An instant later, the bin stop passes under the end of the stop beam to permit the bin or hopper to rotate. Because of its relatively small inertia, the bin or hopper rotates quickly and quickly cuts off further material in the incoming stream so that an accurate weighing is provided.

Brief description of the drawing

The subject matter which I regard as my invention is particularly pointed out and distinctly claimed in the claims. The structure and operation of my invention, together with further objects and advantages, may be better understood from the following description given in connection with the accompanying drawing, in which:

FIGURE 2a shows a cross-sectional view, taken along the lines 2a—2a in FIGURE 3, of certain details of the weigher;

Description of the preferred embodiment—Construction

Figure 1:
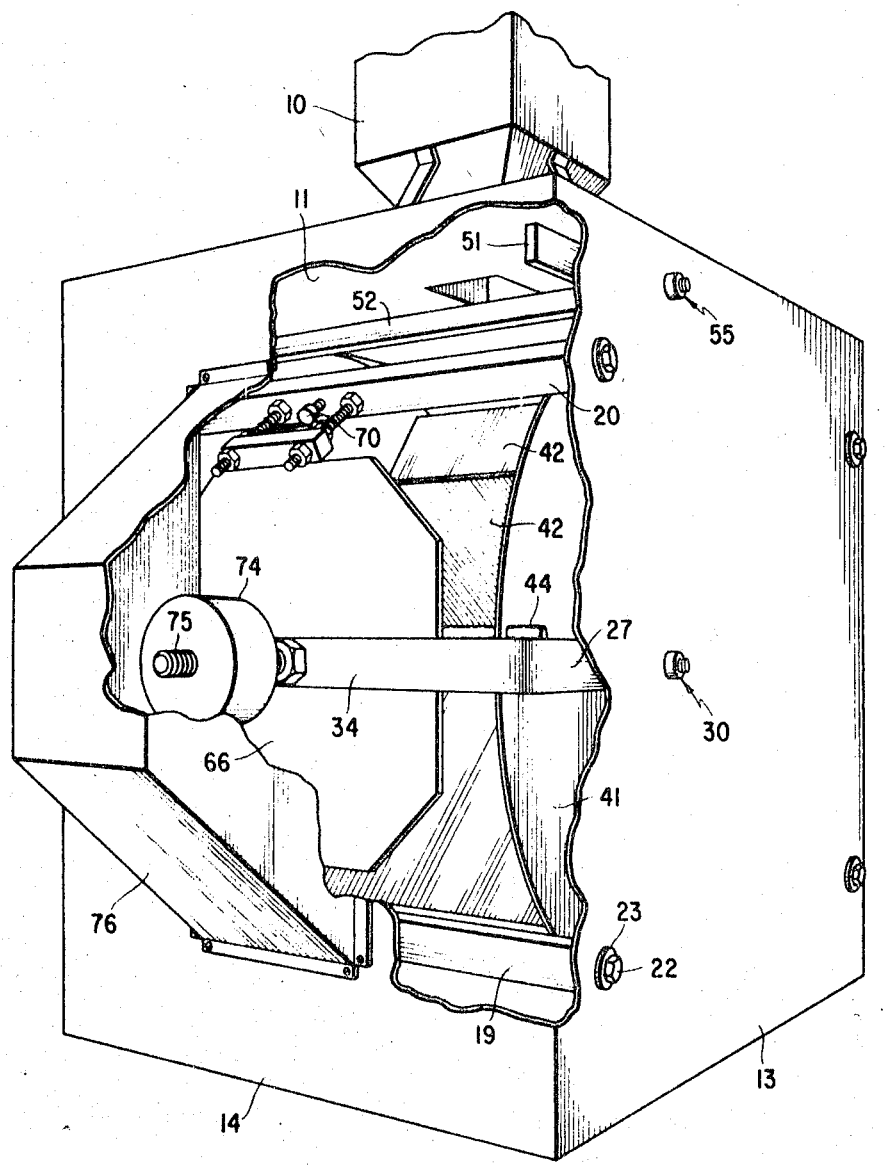
FIGURE 1 shows a perspective end and side view of one embodiment of my weigher.
Figure 2:
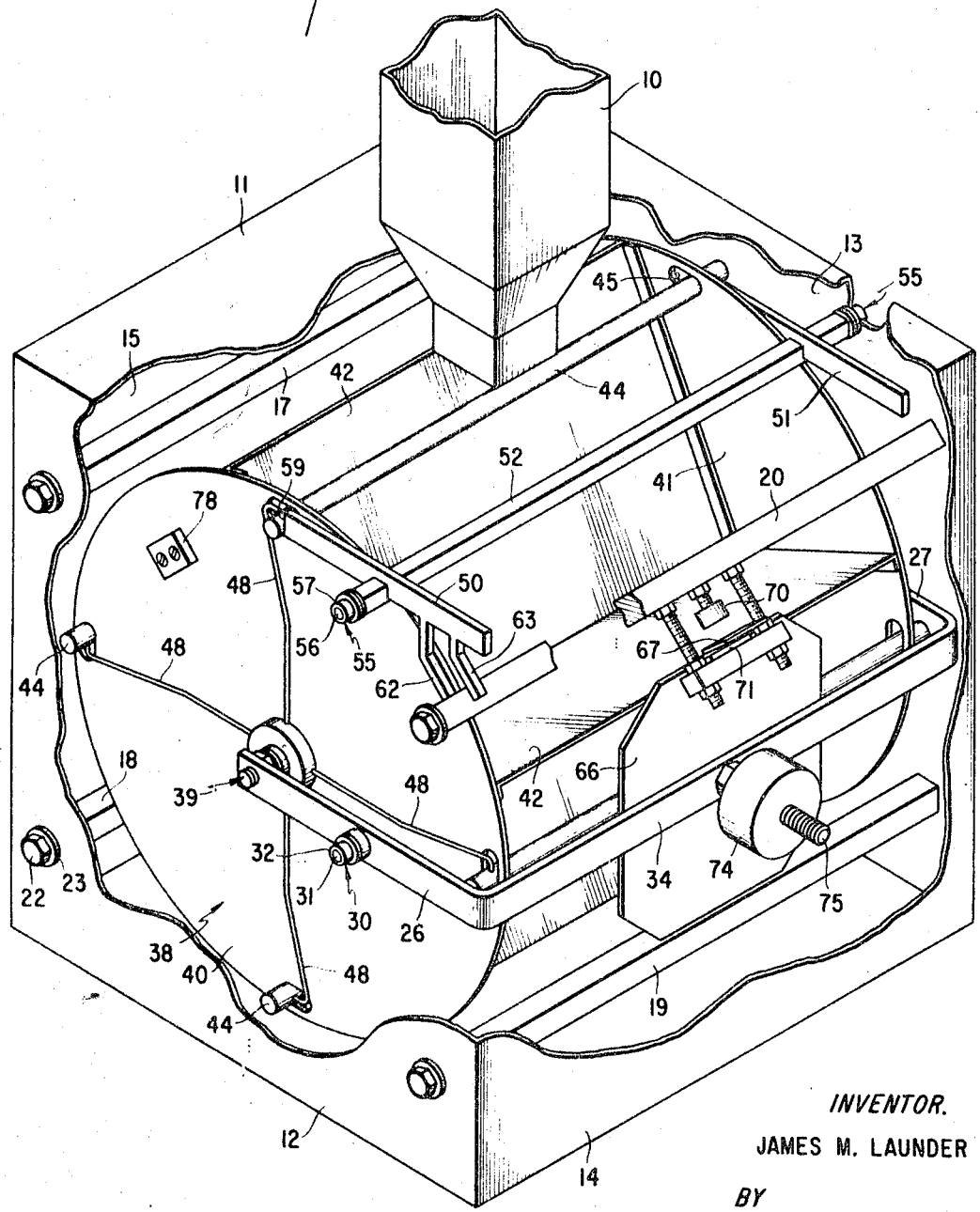
FIGURE 2 shows a perspective top, end, and side view of the weigher of FIGURE 1.

FIGURES 1 and 2 show perspective views of my weigher with portions of the sides broken away to permit the interior of the weigher to be seen. While not necessary, I prefer that as much of the weigher as possible be enclosed in order to protect its parts, and to prevent the spreading or dispersing of dust or other matter from the material being weighed. My weigher is generally rectangular in shape, and has a chute 10 mounted on a top 11 for supplying the dry or granular material to the weigher for weighing. Left and right sides 12, 13, a front 14, and a back 15 are attached to and extend downward from the top 11. The weigher does not include a bottom as the material is discharged downward after being weighed. The left and right sides 12, 13 are held in accurate relation and configuration by four cross members 17, 18, 19, 20. These members 17, 18, 19, 20 may be attached to the sides 12, 13 in any suitable manner, as by bolts 22 which thread into the members 17, 18, 19, 20 and which are provided with washers 23.

Left and right main or bin beams 26, 27 of steel are pivotally mounted on the left and right sides 12, 13 respectively. The beams 26, 27 are substantially identical, and pivot at corresponding points on a common pivot axis provided by main beam pivots 30. I prefer that the pivots 30 comprise a metallic, cylindrical member 31 extending transversely from the bin beams 26, 27 into a cylindrical sleeve or bearing 32 which fits in the sides 12, 13, and which is preferably made of a low friction and self-lubricating type of material such as Teflon. Because of the relatively light weight of my weigher, the metallic, cylindrical member 31 may be of relatively small diameter, and the internal diameter of the sleeve 32 may also be of small diameter. Hence, the pivots 30 require relatively little torque to overcome their friction. The main beams 26, 27 are generally parallel, and are joined at one end by a main beam cross member 34 which, as shown, may be integral with the bin beams 26, 27. Thus, the main beams 26, 27 may be considered a single integral structure.

A rotary bin or hopper 38 is mounted for rotary movement about a common axis provided by bearings or pivots 39 at the other end of the bin beams 26, 27. As shown in the cross-sectional view of FIGURE 2a, the pivot 39 comprises a metallic, cylindrical member 43 of the same diameter as the member 31. The member 43 is threadedly attached to the bin beam 26 and held by a lock nut. The member 43 rotates in a sleeve 46 of low friction material such as Teflon. The sleeve 46 is mounted in a central hub 47 which is rigidly fastened to the plate 40 of the bin 38, and which may also be made of low friction material such as Teflon. Only the pivot 39 for the bin beam 26 is visible in FIGURE 2, and is shown in FIGURE 2a, but it is to be understood that a similar pivot is also provided on the bin beam 27. These pivots 39 also require relatively little torque to overcome their friction. The axis of rotation of the bin 38 provided by the pivots 39 is preferably parallel to the pivot axis of the bin beams 26, 27 provided by the pivots 30. The bin 38 comprises two circular ends or plates 40, 41 which are preferably constructed of a relatively light material such as aluminum or plastic. The bin 38 is divided into four compartments 80, 81, 82, 83 (shown in FIGURES 3 through 6) by plates or partitions which are fastened between the plates 40, 41, and which extend outward in a generally radial direction from the axis of rotation of the bin 38 to the edge or perimeter of the plates 40, 41. While I contemplate that my bin 38 is divided into four compartments or sections 80, 81, 82, 83, it is to be understood that it may be divided into any plurality of such compartments or sections by the appropriate number and location of the plates 42. The plates or partitions 42 may be attached to the circular end plates 40, 41 respectively in any suitable fashion such as by welding or by screws. Or, the bin 38 may be formed of integral cast or molded sections or compartments which are cemented or fastened together. Each compartment in the bin 38 is provided with a cylindrically shaped bin stop 44 of low friction and somewhat resilient material such as nylon. Each stop 44 extends longitudinally across its respective compartment and is positioned in slots or notches 45 in the ends or plates 40, 41. As viewed in FIGURE 2, the rotary bin or hopper 38 is intended to rotate in a clockwise direction. With this assumed direction of rotation, each end of each of the stops 44 is provided with a resilient cushioning or biasing member or spring 48 which extends radially outward from the hub 47 at the center or axial portion of the bin 38 and biases each end of the stop 44 in a clockwise direction. The members 48 provide some absorption of the shock or impact when the stops 44 engage the stop beams, as will be described subsequently. Other methods of absorbing shock or braking the rotation of the bin 38 may also be used.

Figure 3:
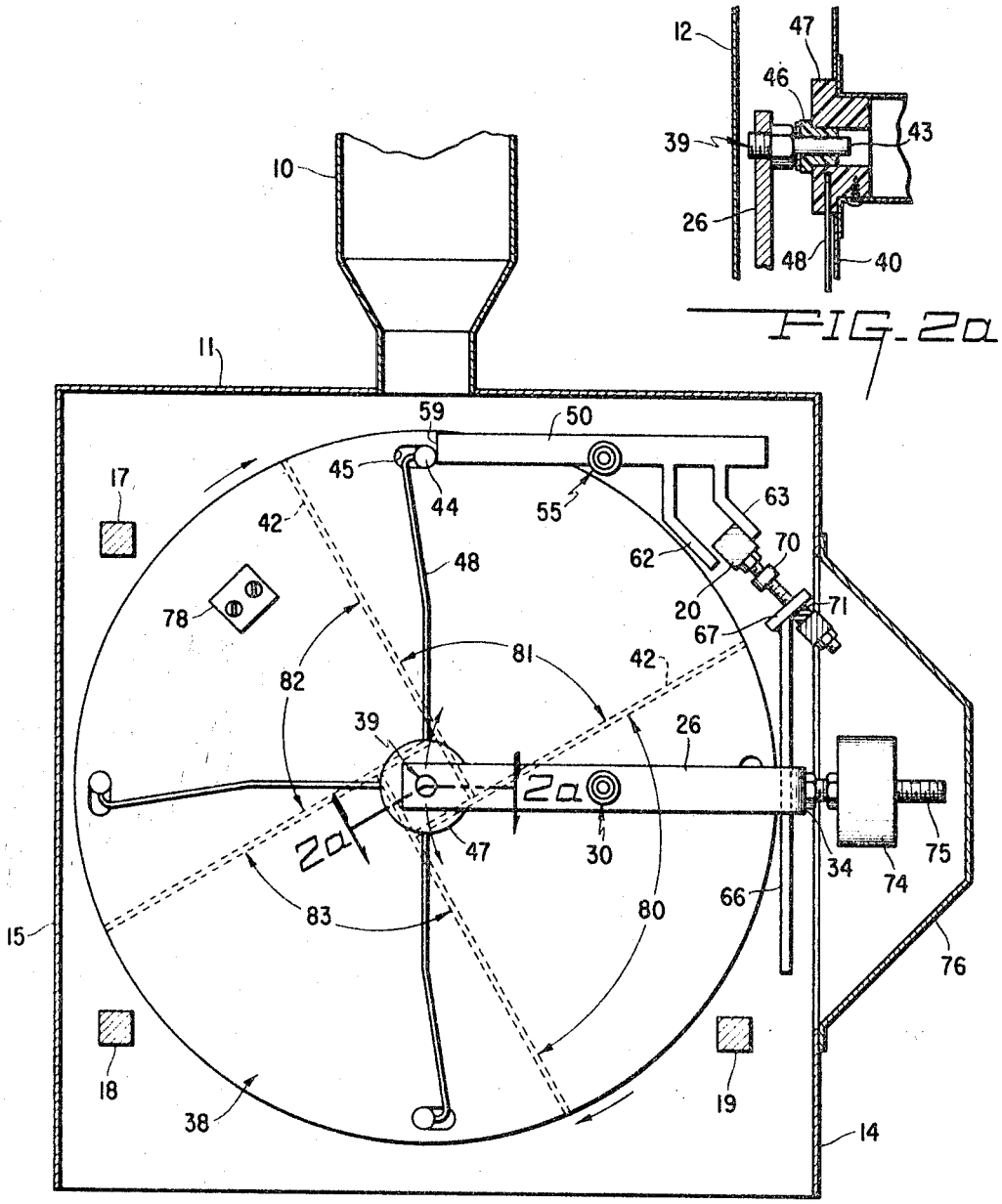
FIGURE 3 shows a side elevational view, partly in cross section, of the weigher of FIGURES 1 and 2 when the weigher bin has stopped and is just beginning to receive material.

Left and right substantially similar and parallel bin stop beams 50, 51 are mounted on a stop beam support 52. The stop beams 50, 51 and the support 52 are preferably made of steel and may be fastened together by welding. The stop beam support 52 is mounted between the left and right sides 12, 13 for pivoting about a common axis provided by two pivots 55. The pivot axis of the stop beam support 52 is preferably parallel to the pivot axis of the bin beams 26, 27 and the rotational axis of the bin 38. The pivots 55 comprise a cylindrical portion 56 which extends from the support beam 52. This cylindrical portion 56 rotates or pivots in a sleeve or bearing 57 which is mounted in the respective sides 12, 13, and which is made of a relatively low friction, self-lubricating material such as Teflon. The stop beams 50, 51 extend toward the bin 38 and terminate at ends 59. The ends 59 are positioned so that when they are engaged by a bin stop 44, the longitudinal axis of that bin stop 44 lies on a line that is preferably parallel to the pivot and rotational axes already described. As can be seen in FIGURE 3, the stop beam pivots 55 and axis are vertically aligned above the main beam pivots 30 and axis. The ends 59 of the stop beams 50, 51 position the engaging bin stop 44 so that the center or axis of the bin stop 44 is vertically aligned above the bin pivots 39 to provide the desired parallelogram configuration. The ends 59 are positioned so that when the bin 38 is in its upper or light weight position, the bin stops 44 strike or engage the ends 59 and prevent the bin or hopper 38 from rotating. At least one of the bin stop beams, the beam 50 in the embodiment shown in FIGURE 2, is provided with a pair of stop beam limit arms 62, 63 at its other end remote from the end 59. These limit arms 62, 63 extend downwardly and at an angle so as to engage opposite sides of the cross member 20 (which acts as a stop), and limit the angle through which the stop beams 50, 51 may pivot. The arm 63 is arranged so that the stop beams 50, 51 are substantially horizontal in their maximum clockwise rotation, and the arm 62 is arranged so that the ends 59 are pivoted slightly downward in their maximum counterclockwise rotation. The stop beams 50, 51 are weighted or biased so that they tend to rotate in a clockwise direction as viewed in FIGURE 3. Thus, the ends 59 tend to rotate upward and the limit arms 62, 63 tend to rotate downward until the limit arm 63 engages the stop 20.

The cross member 34 joining the two bin beams 26, 27 is provided with a plate 66 which is attached to the cross member 34 in a symmetrical position, preferably. This plate 66 carries a bin beam limit arm 67 which is positioned between bin beam stops 70, 71. The stops 70, 71 may be attached to the cross member 20 in any suitable fashion, as by threaded members which permit adjustment. As will be explained in greater detail, the stop 71 is formed of a resilient material, such as a silicone compound which, after hardening, has a resilient or rubber-like quantity. This resilient quality provides a dynamic force to the bin beam limit arm 67 to help start or initiate movement of the weighing mechanism when a compartment of the bin or hopper 38 has almost received the desired weight of material. This resilient quantity can be provided in other ways, as by a compression spring or similar mechanical device. Finally, the cross member 34 between the bin beams 26, 27 is provided with an adjustable weight 74 which may be threaded on a support rod 75 attached to the cross member 34. The weight 74 may be calibrated or marked so as to provide indications of the weight that will be measured with relation to the position of the weight 74. The weight 74 can be made relatively small to provide a sensitive range of adjustment because of the weight of the plate 66. The adjustable weight 74 and its rod 75 may be protected or covered by a suitable housing structure 76 which is attached to the front 14. This structure 76 may be made removable so that the weight 74 may be adjusted, and then covered by the housing 76 to protect this weight and adjustment.

One or more permanent magnets 78 may be attached to the bin plate 40, and a sensing device (not shown) such as a reed switch may be attached to the side 12 near the path of the magnets 78 to indicate movement of each compartment, or to indicate one full revolution of the bin 38, or to provide any number of indications for each complete revolution of the bin 38. This indication can be used in an electrical counting circuit. Also, mechanical counting devices may be used.

Description of the preferred embodiment—operation

The operation of the weigher described in connection with FIGURES 1 and 2 will now be described in connection with FIGURES 3 through 6. FIGURES 3 through 6 show side elevation views of the weigher as seen from the left with the left side 12 removed. FIGURES 3 through 6 show my improved parallelogram configuration formed by the pivot axes of the pivots 30, 55, the rotational axis of the pivots 39, and the center or longitudinal axis of each of the stops 44 at the ends 59 of the stop beams 50, 51 at the four corners of the parallelogram. These axes and the stops are parallel to each other. The pivots 30, 55 are preferably vertically aligned, and the center or axis of the stop 44 at the ends 59 of the stop beams 50, 51 is also preferably vertically aligned with the pivots 39 of the bin or hopper 38. FIGURES 3 through 6 also show the configuration of the compartments 80, 81, 82, 83 formed by the plates 42, and show how each compartment has a shape which may be generally described as a sector of approximately 90 degrees.

In FIGURE 3, it has been assumed that material to be weighed is flowing rapidly and constantly (without interruption) from the chute 10. It has also been assumed that the bin or hopper 38 has just rotated clockwise 90 degrees and discharge the material in the compartment 80 supplied by a previous weighing. This discharge of material has lightened the bin or hopper 38 so that the weight 74 combined with the plate 66 and the cross member 34 pivot the bin beams 26, 27 in a clockwise direction as viewed in FIGURE 3 to raise the bin or hopper 38. With the bin raised, the stop 44 associated with the compartment 81 strikes or engages the ends 59 of the two stop beams 50, 51. The beams 26, 27 are stopped by the limit arm 67 engaging and compressing the resilient stop 71 which tends to push the limit arm 67 up and to the left as viewed in FIGURE 3. The weight of the limit arms 62, 63 has previously caused the stop beams 50, 51 to pivot in a clockwise direction until the limit arm 63 engages or is positioned against the cross member or stop 20. With the stop beams 50, 51 in this position, the stop 44 strikes the ends 59 of these beams 50, 51 and prevents further clockwise rotation of the bin or hopper 38. At this point, the stop beams 50, 51 are generally parallel to the bin beams 26, 27, and are preferably horizontal. More accurately, an imaginary line between the axis of the pivot 55 and the center of the stop 44 is parallel to an imaginary line bewteen the pivots 30, 39, and these two imaginary lines are horizontal.

Figure 4:
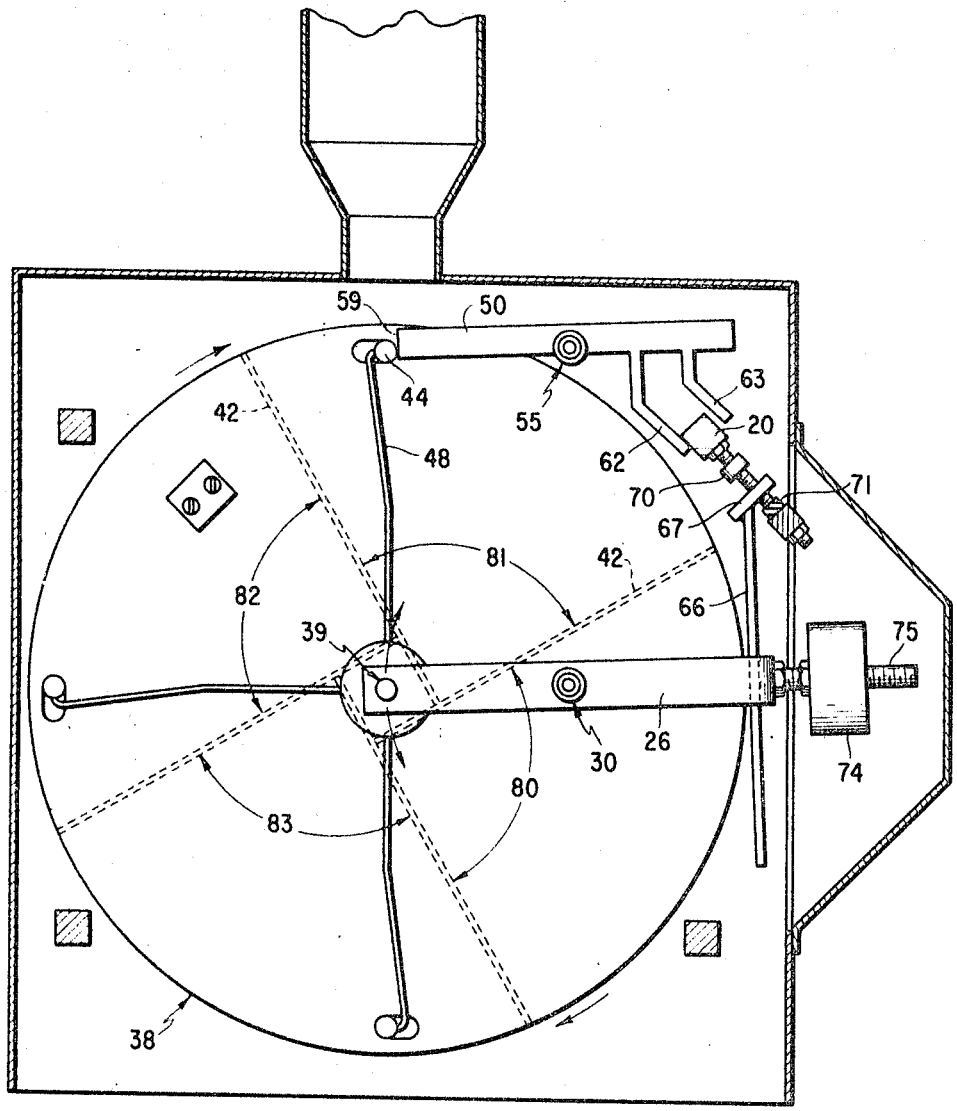
FIGURE 4 shows a side elevation view, partly in cross section, of the weigher of FIGURES 1 and 2 when the weigher bin has received material and the stop beam end has pivoted to its lowest position.
Figure 5:
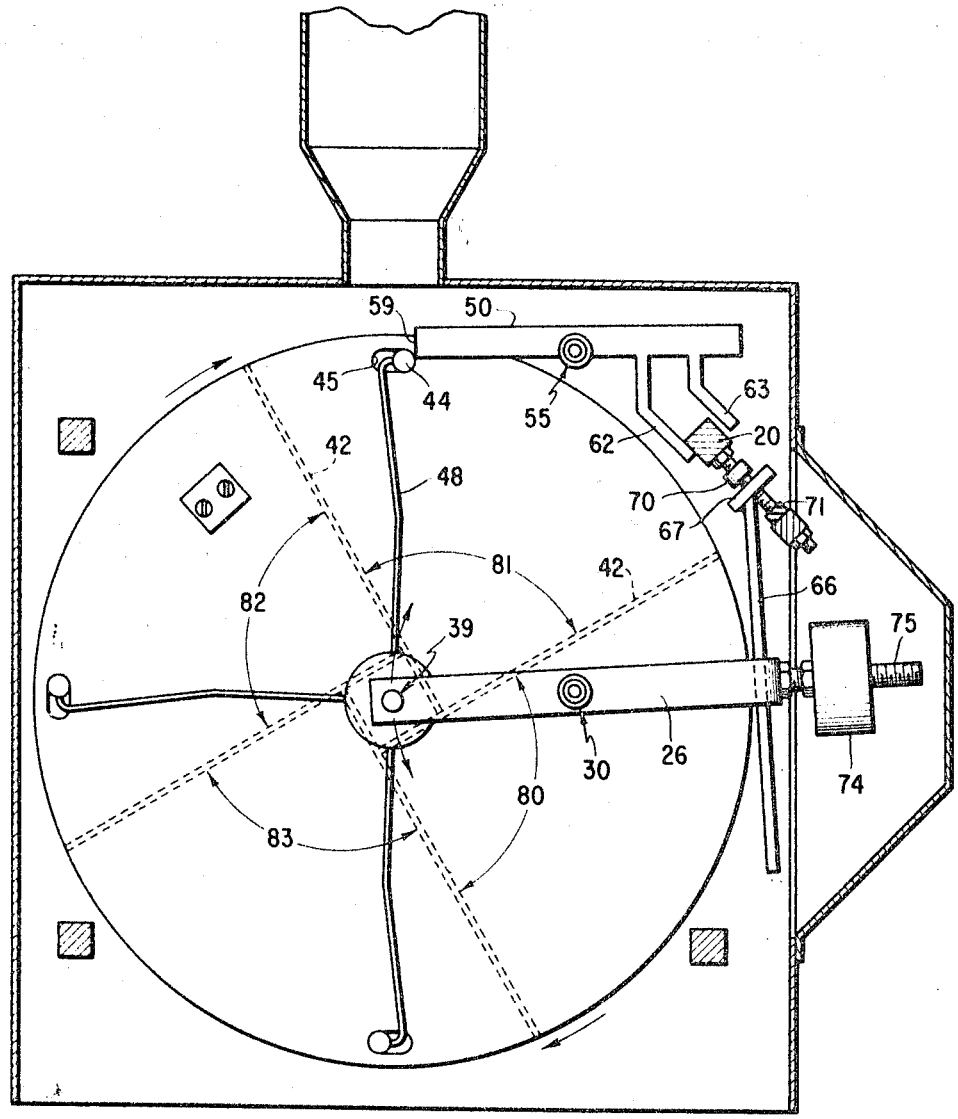
FIGURE 5 shows a side elevation view, partly in cross section, of the weigher of FIGURES 1 and 2 when the weigher bin has received almost the desired weight of material and the bin stop is about to pass under the stop beam.
Figure 6:
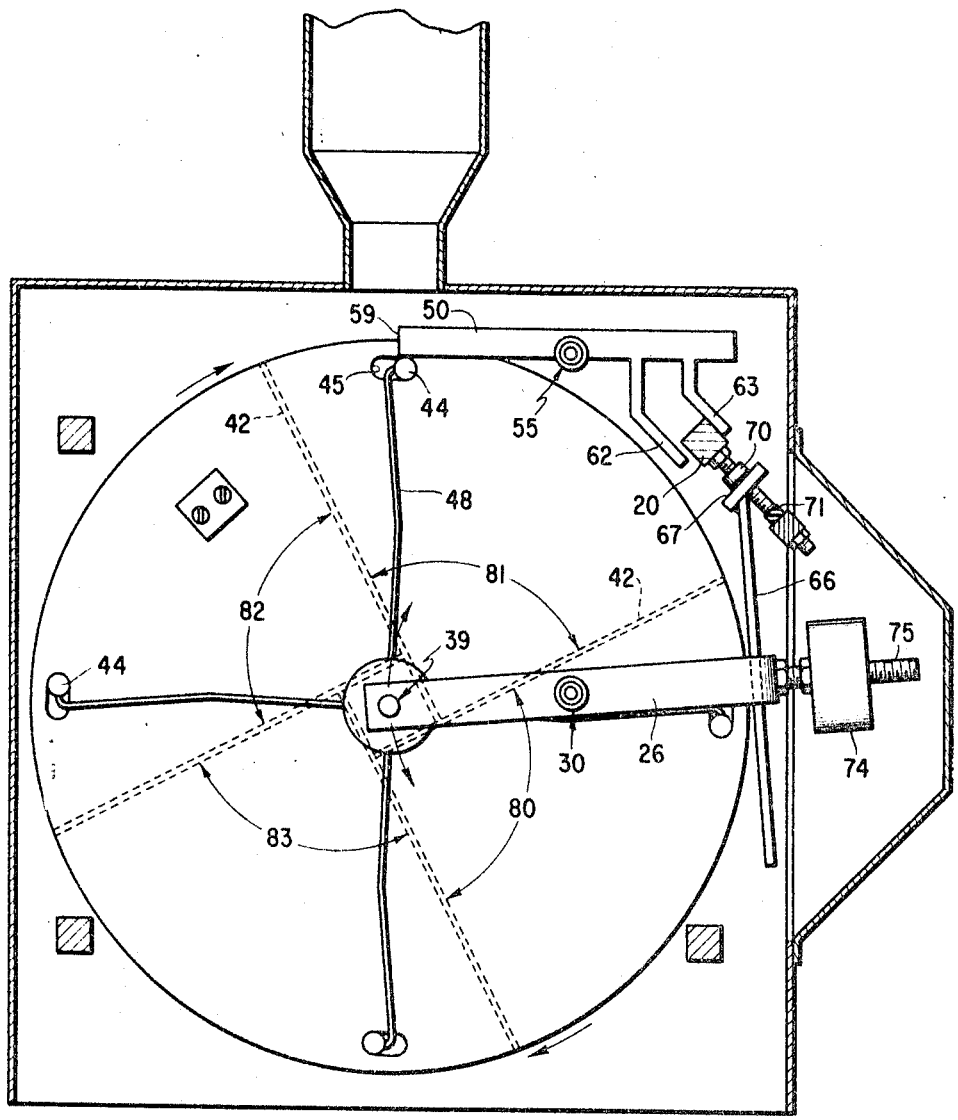
FIGURE 6 shows a side elevation view, partly in cross section, of the weigher of FIGURES 1 and 2 when the weigher bin has received or very nearly received the desired weight of material, and the bin stop has passed under the stop beam so that the bin can rotate and discharge the material.

As material flows from the chute 10 into the compartment 81 immediately beneath it, the added weight of this material urges the bin 38 to descend. This descent causes the bin beams 26, 27 to pivot in a counterclockwise direction. The resilient material in the stop 71 aids in initiating this pivoting. As the bin 38 descends because of the constantly increasing weight of material in the compartment 81, the stop 44 of the compartment 81, because of its frictional engagement with the ends 59 of the stop beams 50, 51, also causes the stop beams 50, 51 to pivot in a counterclockwise direction. Actually, the ends 59 of the stop beams 50, 51 maintain a rolling frictional engagement with the stop 44 but do not slide on the stop 44 during this pivoting. This rolling action causes the point of engagement of the stop 44 on the ends 59 to move upward a small distance. During this pivoting, the two imaginary lines mentioned in the immediately preceding paragraph remain substantially parallel. As the stop beams 50, 51 pivot in a counterclockwise direction, the limit arm 63 moves upward and away from the cross member 20, and the limit arm 62 moves upward and toward the cross member 20. When the limit arm 62 engages the cross member 20, the stop beams 50, 51 can pivot no further. The limit arm 67 has moved off of the resilient stop 71. The condition of the various parts at this time is shown in FIGURE 4. The ends 59 of the stop beams 50, 51, can move no farther. But the momentum of the moving parts overcomes the frictional engagement between the stop 44 and the ends 59 so that the stop 44 then slides along the ends 59 and the bin or hopper 38 continues to descend. The stop 44 of the compartment 81 also descends to a position where its curved surface can slide under the lower corner of the ends 59 to force the ends 59 upward. The condition of the various parts just prior to the stop 44 passing beneath the ends 59 is shown in FIGURE 5. In FIGURE 5, it will be noted that the bin beams 26, 27 can pivot a little more because the limit arm 67 has not reached the stop 70. Once the stop 44 reaches the lower corner of the ends 59, the curved surface forces the ends 59 rapidly upward since the bin 38 tends to rotate clockwise because of the offset weight of material in the compartment 81. The ends 59 are aided in their upward movement by the tendency of the stop beams 50, 51 to rotate in a clockwise direction. The action of the curved surface of the stop 44 pushing the ends 59 upward takes place very quickly and near the point in time when the desired weight of material has been received in the compartment 81. This rapid and precise action results in accurate weighings which can be precisely repeated time after time, and yet causes little wear on the stop 44 or the ends 59 which could interfere with continued accuracy. FIGURE 6 shows the various parts just after the stop 44 has passed under the lower corner of the ends 59. It will be noted that the stop beams 50, 51 are again horizontal with the limit arm 63 engaging the cross member 20, and that the beams 26, 27 can pivot no farther because the limit arm 67 now engages the stop 70. With the stop 44 clear, the bin 38 is free to rotate and the weight of material in the compartment 81 to the right of the pivots 39 causes the bin 38 to rotate rapidly in a clockwise direction.

Because of the light construction and low friction bearings or pivots of my weigher, the time required for the bin or hopper 38 to rotate the trailing plate 42 of the compartment 81 past the chute 10 is so short that substantially no material flows or passes into the discharging compartment 81. This action provides a more accurate individual weighing and more consistent weighings. After the bin 38 rotates approximately 35 degrees, the leading plate 42 of the compartment 81 is sloped downward and material begins to be discharged. The bin 38 thus becomes sufficiently light before it has rotated 90 degrees so that the weight 74 raises the bin 38 and the stop 44 of the compartment 82 engages the ends 59 of the stop beams 50, 51. The bin 38 is raised relatively rapidly so that the stop 44 of the compartment 82 is sufficiently high to engage the ends 59 and stop rotation of the bin or hopper 38. The resilient members 48 absorb any shock or impact between the stops 44 and the ends 59 to bring the bin or hopper 38 to a more gradual stop, and to reduce shock. With the bin 38 again stopped, the compartment 82 is filled with the desired weight of material, the bin 38 descends, rotates, and discharges the material. This cycle is repeated as long as material flows from the chute 10.

Conclusion

It will thus be seen that my weigher provides an improved construction and operation which has not been provided in previous rotary weighers of this type. My weigher is relatively accurate and high speed in its operation because of its light weight construction which permits relatively small and low friction bearings, particularly the rotary pivots 39, the bin beam pivots 30, and the stop beam pivots 55. A more accurate weighing is provided by my weigher because of the parallelogram configuration provided by the bin beam 26, 27 being parallel to the stop beams 50, 51 and the pivot and rotational axes being at the corners of the parallelogram. While the stops 44 are made of relatively low friction materials, they engage the ends 59 of the stop beams 50, 51 with sufficient friction to pivot the stop beams 50, 51 in the counterclockwise direction as soon as movement of the bin 38 occurs. This movement is started by the urging of the resilient stop 71 slightly before the desired weight of material has been added to provide dynamic action that overcomes the static friction of the pivots 30, 39, and 55. The stop beams 50, 51 thus pivot in substantially parallel relation with the bin beams 26, 27 so that the parallelogram configuration is provided during the entire weighing process. When the stop beams 50, 51 are stopped in their counterclockwise pivoting by the limit arm 62 engaging the cross member 20, the release of the stop 44 from the ends 59 is rapid and abrupt because of the low friction between the stop 44 and the ends 59, because of the inertia of the bin 38 and other moving parts, and because the stop beams 50, 51 are driven away from the stop 44 both by their own balance and by the tendency of the bin 38 to rotate. These features provide relatively high speed movement with relatively little friction and wear for relatively high speed and accurate weighing. The use of relatively light weight materials in my weigher provides a more accurate weighing. For example, if the tare weight of the bin, its beams, and other elements is 10 pounds, and if 10 pounds of material is to be weighed, then an accuracy of one percent could provide an error of plus or minus 0.2 pound. However, if the tare weight is only 5 pounds and 10 pounds of material is to be weighed, then the same one percent accuracy would result in an error of only plus or minus 0.15 pound. Further, the reduced weight of the parts, particularly the bin 38, permits a greater rotary acceleration of the bin 38 after release. This allows the weigher to cut off the incoming material more rapidly, and thus provides greater accuracy since variations in the material stream from the chute 10 will have less effect.

A weigher having the configuration shown in the drawing was constructed and operated. The bin 38 was made of 0.031 inch aluminum with its ends 40, 41, 16 inches in diameter and with a length of 10 inches. The other parts were proportioned accordingly. With the weight 74 set to weigh 5 pounds, this weigher provided a weighing every 6 seconds. Ten such weighings were made with an overall accuracy better than plus or minus 0.1 persent. Another similar weigher was used to weigh feed on a poultry farm. Over a period of 210 days, this weigher weighed a total of 630,000 pounds of feed also to an accuracy of plus or minus 0.1 percent of the purchased weight of feed. The weighings were made in increments of 5 pounds, so that approximately 126,000 weighings were made. The weigher was not recalibrated during this time, and showed no signs of wear.

Although I have shown only one embodiment of my weigher, it may be modified. Different size weighers may be made, and only single cantilever pivots may be used, particularly on smaller weighers. The weighers may be used for other materials such as liquids, or gases which could rise upward under the weigher. The pivots 30, 55 and the stop 44 and pivots 39 need not be respectively vertically aligned as long as the desired parallelogram configuration is kept. The stop beams 50, 51 may be provided with restraining ends for the stop 44, and the compartments 80, 81, 82, 83 formed so that the bin 38 can rotate in the reverse direction to that shown. While the ends 59 of the stop beams 50, 51 were made flat and square, they may be rounded along a radius centered on the pivots 55 to provide even greater parallelogram accuracy. The ends 59 may be replaced by a single stop surface that engages the center of the stops 44. The balance weight 75 may be fixed, or may be represented by weight in the plate 66 or some structure on the bin beams 26, 27 for fixed weighings. A single cantilever support for the bin or the bin beam, or both, may also be used. The stops 44 may also take other forms. The dynamic action of the stop 71 may be provided in other ways although I prefer a resilient material as mentioned. Therefore, while my invention has been described with reference to a particular embodiment, it is to be understood that modifications may be made without departing from the spirit of the invention

What I claim as new and desire to secure by Letters Patent of the United States is:

1. An improved weigher for dry materials and the like, comprising:
   (a) at least one bin beam;
   (b) means mounting said bin beam for pivoting about a first axis;
   (c) a bin rotatably mounted on one end of said bin beam for rotating about a second axis that is parallel to and spaced a first distance from said first axis;
   (d) said bin beam having a balance weight at the other end thereof;
   (e) at least one stop beam;
   (f) means mounting said stop beam for pivoting about a third axis that is parallel to said first and second axes, said stop beam having a stop surface that is spaced from said third axis;
   (g) and stop means attached to said bin at selected locations for engaging said stop surface and preventing rotation of said bin when said bin beam and said second axis are in an upper position and for clearing said stop surface and permitting rotation of said bin beam and said second axis are in a lower position the center of said stop means being spaced said first distance from said third axis when said stop means engages said stop surface.

2. The weigher of claim 1 wherein engagement of said stop means and said stop surface causes said stop beam and said stop surface to pivot in response to pivotal movement of said bin beam and said second axis toward said lower position.

3. The weigher of claim 1 and further comprising resilient means urging said bin beam and said second axis toward said lower position when said bin beam and said second axis are in said upper position.

4. The weigher of claim 3 wherein engagement of said stop means and said stop surface causes said stop beam and said stop surface to pivot in response to pivotal movement of said bin beam and said second axis toward said lower position.

5. An improved weigher having a parallelogram configuration, comprising:
   (a) first and second substantially parallel and similar main beams having a first pivot axis positioned at a first corner of said parallelogram configuration, said first and second main beams extending from said first axis in a first direction to first ends in the vicinity of a second corner of said parallelogram configuration adjacent said first corner, and extending from said first axis in a second direction opposite said first direction to second ends;
   (b) a balance weight positioned in the vicinity of said second ends of said first and second main beams;
   (c) a bin having a plurality of compartments therein mounted on said first ends of said first and second main beams for rotation about a second axis that is parallel to said first axis and that is positioned at said second corner;
   (d) stop beam means having a third pivot axis that is parallel to said first axis and that is positioned at a third corner of said parallelogram configuration adjacent said first corner, said stop beam means extending from said third axis in said first direction to provide at least one stop surface in the vicinity of a fourth corner of said parallelogram configuration adjacent said second corner, and extending from said third axis in said second direction to second ends;
   (e) a stop mounted on said bin for each of said compartments, each of said stops being arranged to engage said stop surface when said stop is at said fourth corner to prevent said bin from rotating in response to said weigher being at least partially empty and being arranged to clear said stop surface to permit said bin to rotate in response to said weigher having a desired weight that pivots said second axis and said bin in a downward direction;
   (f) and means for engaging said second ends of said main beams to urge said main beams to pivot said second axis and said bin in a downward direction.

6. The weigher of claim 5 wherein said stop beam means comprises two substantially similar and parallel beams, each of which extends from said third axis in said first direction to first ends, each of which form a stop surface in the vicinity of said fourth corner.

7. The weigher of claim 5 wherein each of said stops in engagement with said stop surface causes said stop surface and said stop beams to move therewith as said bin moves in said downward direction.

8. The weigher of claim 6 wherein each of said stops in engagement with said stop surfaces causes said first ends of said stop beams to pivot downward as said bin moves downward so that said stop beams move substantially parallel with said bin beams.

9. The weigher of claim 8 wherein means are provided for limiting said downward pivoting of said first ends of said stop beams.

10. The weigher of claim 9 wherein said first and third axes are positioned in a substantially vertical plane.

11. The weigher of claim 9 wherein said first and third axes are positioned in a substantially vertical plane, and wherein said second axis and said stop surfaces are positioned in a substantially vertical plane.

12. An improved stop and release mechanism for a rotary type of weigher having a bin that rotates about a main axis, said bin being stopped in a raised position to receive material to be weighed, moving to a lowered position to rotate and to dump the previously received material, and being stopped in said raised position to receive additional material to be weighed, said stop and release mechanism comprising:
   (a) a stop beam mounted for pivoting about an axis that is parallel to said main axis of said bin, said stop beam pivot axis being in a fixed position and said stop beam being positioned near said bin;
   (b) and a stop mounted on said bin to engage said stop beam when said bin is in said raised positions and to become disengaged from said stop beam when said bin is in said lowered position, the respective engaging portions of said stop and said stop beam having relatively low friction, and said stop being arranged to urge said engaging portion of said stop beam in an upward direction when said bin is moved toward said lowered position to provide a quick release.

13. The improved stop and release mechanism of claim 12 wherein said engaging portion of said stop beam is a flat surface and said engaging portion of said stop is a curved surface.

14. The improved stop and release mechanism of claim 12 wherein said engaging portion of said stop beam is a curved surface and said engaging portion of said stop is a flat surface.

References Cited

UNITED STATES PATENTS

| | | | |
|---|---|---|---|
| 1,116,254 | 11/1914 | Espenhayr et al. | 177—83 |
| 1,721,025 | 6/1929 | Langerak | 177—88 |
| 2,568,253 | 9/1951 | Porter | 177—85 |
| 2,597,120 | 5/1952 | McCargar | 177—84 |
| 2,971,740 | 2/1961 | Davis | 177—83 |

ROBERT S. WARD, Jr., Primary Examiner

U.S. Cl. X.R.

177—105

UNITED STATES PATENT OFFICE
CERTIFICATE OF CORRECTION

Patent No. 3,458,002  
July 29, 1969

James M. Launder

It is certified that error appears in the above identified patent and that said Letters Patent are hereby corrected as shown below:

Column 2, line 39, "wiegher" should read -- weigher --. Column 8, line 40, "persent" should read -- percent --. Column 9, line 23, after "bin" insert -- when said bin --.

Signed and sealed this 21st day of April 1970.

(SEAL)  
Attest:

Edward M. Fletcher, Jr.  
Attesting Officer

WILLIAM E. SCHUYLER, JR.  
Commissioner of Patents